March 18, 1924.
C. D. SMITH
VULCANIZER CONNECTION
Filed April 28, 1920
1,487,696
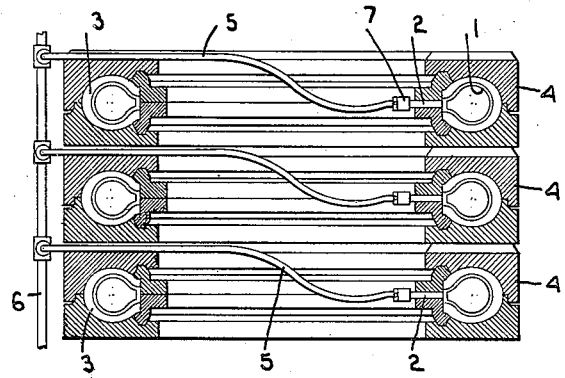
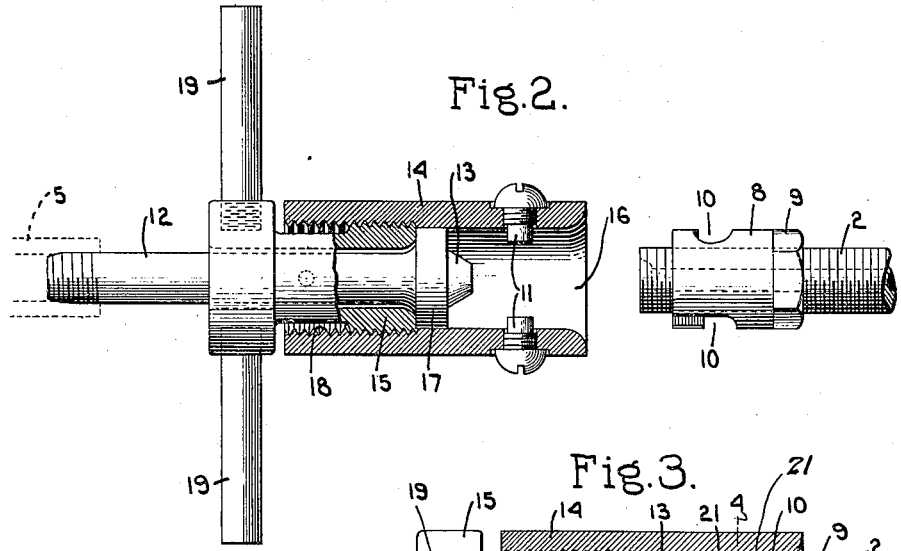
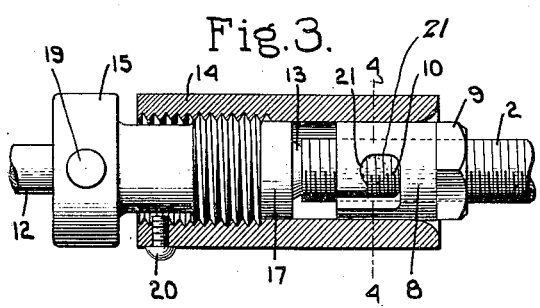
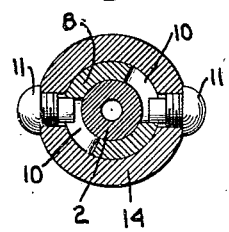
Inventor
Clifford D. Smith
By G. L. Ely
Attorney Patented Mar. 18, 1924.

1,487,696

UNITED STATES PATENT OFFICE.

CLIFFORD D. SMITH, OF AKRON, OHIO, ASSIGNOR TO THE FIRESTONE TIRE AND RUBBER COMPANY, OF AKRON, OHIO, A CORPORATION OF OHIO.

VULCANIZER CONNECTION.

Application filed April 28, 1920. Serial No. 377,247.

*To all whom it may concern:*

Be it known that I, CLIFFORD D. SMITH, a citizen of the United States, residing at Akron, in the county of Summit and State of Ohio, have invented certain new and useful Improvements in Vulcanizer Connections, of which the following is a specification.

This invention relates to a connection for coupling together the ends of pipes or tubes. This coupling has been shown in connection with the expansible bag or core and the supply tubes for the pressure mechanism used in vulcanizing pneumatic tires. In the service of a coupling with a vulcanizing apparatus it is subjected to very hard usage and careless treatment. With my invention I dispense entirely with the use of wrenches and present a connection that is simple and durable and one in which all the undesirable features of the ordinary connection are not encountered.

One object of this invention is to provide a connection that may be operated with great facility and accuracy.

Another object is to provide a connection in which there is no danger of stripping the threads, as often happens from imperfect alignment.

These and other objects will more fully appear as the description proceeds and will be especially pointed out in the claims.

Fig. 1 is a sectional view through a plurality of tire molds showing the manner of connecting the air bag with the pressure means.

Fig. 2 is a sectional view of the preferred form of my invention showing the parts in position for operation.

Fig. 3 is a sectional view similar to Fig. 2, but showing the parts in coupled arrangement.

Fig. 4 is a view on line 4—4, Fig. 3.

The coupling forming the subject matter of this invention is designed to be incorporated with expansible bags used in the art of vulcanizing. It is not, however, limited to such use as this improved coupling can be utilized to connect together pipes or tubes of any type for any purpose. The expansible bags are designated at 1 and have the usual valve stem 2. A tire carcass, in which the bag is placed, is shown at 3, and the standard two part mold at 4. Numeral 5 represents the flexible tubes leading from any source of supply, for the pressure medium, such as a pipe 6, and are connected to the valve stem 2 by the coupling 7.

The coupling 7 is easily operable and is preferably made in two sections, one of which is attached to the flexible tube 5, and the other of which is connected to the valve stem 2.

The latter named section comprises a locking member in the form of an internally screw-threaded sleeve 8, which is screwed on the end of the valve stem 2, and is locked thereon by a nut 9. The sleeve 8 is provided with two bayonet slots 10, which are intended to cooperate with the pins 11, in a manner hereinafter described.

The flexible tube 5 has the stem 12 attached to it in any suitable method. The stem 12 is the connecting unit through which the pressure medium is transferred from one pipe to the other, and is formed with a cone-shaped end 13 adapted to enter the aperture in the valve stem 2 and to seat therein, thus forming an air tight joint. The stem 12 is held and locked in contact with the valve stem. A tubular casing 14, in which the stem 12 and tightening member 15 are operated, carries the pins 11, and is provided with a suitable flared aperture 16 to receive the sleeve 8. A head 17 is formed on the stem 12 adjacent the cone 13. The head 17 is slidable in the casing and is pressed toward the opening 16 by the member 15, which is screw-threaded to engage internal screw threads 18 provided in the casing 14. The member 15 carries radially extending pins 19 outside the casing, which are used as handles and are of sufficient length to allow for the necessary leverage to lock the parts together. A set screw 20 prevents the part 15 from being unscrewed too far.

To lock the coupling together, the casing 14 is first slipped over the sleeve 8, the pins 11 entering the bayonet slots 10, and are then given a slight turn to place the pins 11 in the offset portion or recesses 21 of the slots 10. Then the locking or tightening member 15 is turned down and it forces the cone-shaped end 13 of the stem 12 into the opening in the valve stem, thereby locking together both sections of the coupling and connecting the tube 5 to the stem 2, the tubular casing being held by the pins 11.

It will be seen that the coupling described above is very simple and efficient, and easily operable. There is no danger of stripping the threads on the valve stem as is not unusual in the use of the ordinary coupling or stuffing box. This improved connection is operated with facility and speed as is desirable when used on vulcanizing apparatus, the vulcanizers being hot and it being uncomfortable to handle the connection.

The foregoing detailed description has been given for clearness of understanding only and no unnecessary limitation should be understood therefrom. Many changes in form and construction may be made without departing from the spirit of the invention within the scope of the appended claims.

I claim:

1. A separable pipe connection comprising two parts, one of said parts telescoping within the other part, a bayonet slot on one of said parts and a projection on the other part designated to co-operate with the slot to couple the two parts together, two pipe ends connected to the two said parts and means to draw the pipe ends together after the two parts have become engaged without changing the angular relation of the ends.

2. A separable connection comprising a casing provided with a central opening and internal screw threads, a projection extending into said opening, a sleeve slidable in said opening, said sleeve having a bayonet slot therein to cooperate with said projection and means to lock the sleeve in the casing.

3. A separable connection comprising a sleeve adapted to fit over the end of a pipe, a bayonet slot in said sleeve, a tubular casing intended to fit over said sleeve, a projection on said casing to cooperate with said bayonet slot, a stem attached to another pipe slidable in said casing and means to force the stem in contact with said first named pipe.

4. A separable connection comprising a sleeve adapted to fit over the end of a pipe, a bayonet slot in said sleeve, a tubular casing intended to fit over said sleeve, a projection on said casing to cooperate with said bayonet slot, a stem attached to another pipe slidable in said casing and means to force the stem in contact with said first named pipe, said locking means being threaded in said casing.

5. Means for connecting two pipes comprising a casing attached to one of said pipes, a sleeve connected to the other pipe, means on said casing and said sleeve to unite the said members, a screw threaded tightening element within the casing said tightening element bearing on one of the pipes to force it against the other pipe.

6. In an apparatus for the uses described, a pipe having a head thereon adapted to bear against the end of another pipe, a tubular sleeve to surround the parts, means on said sleeve to interengage with the second named pipe, and a tightening element having screw threaded connection with the sleeve and bearing on the head.

CLIFFORD D. SMITH.